United States Patent
Vemuri et al.

(10) Patent No.: US 12,293,613 B2
(45) Date of Patent: May 6, 2025

(54) SYSTEMS AND METHODS FOR VEHICULAR COMPUTATION MANAGEMENT

(71) Applicant: GM GLOBAL TECHNOLOGY OPERATIONS LLC, Detroit, MI (US)

(72) Inventors: Venkata Naga Siva Vikas Vemuri, Farmington Hills, MI (US); Chandra S Namuduri, Troy, MI (US); Andrew J MacDonald, Grosse Pointe Park, MI (US); Omer Tsimhoni, Bloomfield Hills, MI (US); Ashhad Mohammed, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 233 days.

(21) Appl. No.: 18/048,970

(22) Filed: Oct. 24, 2022

(65) Prior Publication Data

US 2024/0135756 A1 Apr. 25, 2024
US 2024/0233450 A9 Jul. 11, 2024

(51) Int. Cl.
*G07C 5/00* (2006.01)
*B60L 53/62* (2019.01)
*B60L 58/12* (2019.01)
*G01C 21/34* (2006.01)

(52) U.S. Cl.
CPC .............. *G07C 5/008* (2013.01); *B60L 53/62* (2019.02); *B60L 58/12* (2019.02); *G01C 21/3469* (2013.01)

(58) Field of Classification Search
CPC ......... G07C 5/008; B60L 53/62; B60L 58/12; G01C 21/3469; G06F 2209/506; G06F 2209/508; G06F 9/5094; H02J 7/00; H02J 7/0048; H02J 2310/48; H04W 52/0225;
(Continued)

(56) References Cited

U.S. PATENT DOCUMENTS

| 2012/0109407 A1* | 5/2012 | Yousefi | H04W 4/46 701/1 |
| 2013/0158838 A1* | 6/2013 | Yorke | B60W 10/115 701/123 |

(Continued)

FOREIGN PATENT DOCUMENTS

JP 2014237351 A * 12/2014

*Primary Examiner* — Nga X Nguyen
(74) *Attorney, Agent, or Firm* — Lorenz & Kopf LLP

(57) ABSTRACT

Systems and methods are provided for vehicular computation management. The system includes, onboard a vehicle, electric control units (ECUs), a battery, a communication system, and a controller. The controller is configured to monitor energy consumption, operate the vehicle as a computational hub when the energy consumption is less than a threshold, including providing computational resources to an external node, determine whether the vehicle has excess energy and computational capacity when the energy consumption is equal to or greater than the threshold, including determining a usage of each of the ECUs and determining an energy consumption of tasks executing thereon, and operate the vehicle as a hybrid computational hub when the vehicle has excess energy and computational capacity, including providing excess computational capacity of the ECUs to the external node.

20 Claims, 6 Drawing Sheets

(58) Field of Classification Search
CPC ......... H04W 52/0229; H04W 52/0251; H04W 52/0261
See application file for complete search history.

(56) References Cited

U.S. PATENT DOCUMENTS

| | | | |
|---|---|---|---|
| 2015/0243151 A1* | 8/2015 | Wright | B60W 50/14 340/425.5 |
| 2016/0152152 A1* | 6/2016 | Gaither | G01C 21/3697 701/22 |
| 2020/0271470 A1* | 8/2020 | Symanow | B60W 20/12 |

* cited by examiner

SYSTEMS AND METHODS FOR VEHICULAR COMPUTATION MANAGEMENT

INTRODUCTION

The technical field generally relates to management of processing computational tasks onboard a vehicle, and more particularly relates to systems and methods for operating a vehicle as a computational hub or offloading computational tasks based, at least in part, on energy consumption of the vehicle.

A vehicle may include a plurality of electronic control units (ECUs) that, in general, operate as onboard systems to control one or more electrical systems in a vehicle. Exemplary ECUs may include, but are not limited to, an engine control module (ECM), a powertrain control module (PCM), a transmission control module (TCM), a brake control module (EBCM), a central control module (CCM), a central timing module (CTM), a general electronic module (GEM), a body control module (BCM), and a suspension control module (SCM).

Modern vehicles continue to be produced with greater quantities of ECUs as well as additional functionalities for such ECUs thereby increasing computational requirements of the vehicles. This may present challenges to battery energy consumption and management which is particularly important for electric vehicles whose propulsion relies on such battery energy reserves. For example, a range for an electric vehicle may be significantly reduced by occupants' use of high energy consuming applications.

Accordingly, it is desirable to provide a system capable of addressing a vehicle's computational needs in a manner that reduces an impact associated therewith on the vehicles energy reserves. Furthermore, other desirable features and characteristics of the present invention will become apparent from the subsequent detailed description and the appended claims, taken in conjunction with the accompanying drawings and the foregoing technical field and background.

SUMMARY

A system is provided for computation management of a vehicle. In one embodiment, the system includes a plurality of electric control units (ECUs) onboard the vehicle, a battery onboard the vehicle that is configured to provide electrical energy to the plurality of ECUs, a communication system onboard the vehicle configured to receive and transmit data through a wireless communication network, a controller in communication with the plurality of ECUs, the battery, and the communication system. The controller is configured to, by a processor: monitor the electrical energy consumption of the battery, operate the vehicle as a computational hub when the electrical energy consumption of the battery is less than an energy consumption threshold, wherein operating the vehicle as the computational hub includes providing the computational resources of the plurality of ECUs to an external node connected to the vehicle through the wireless communication network for use in processing a computational task as requested by the external node, determine whether the vehicle has excess electrical energy and computational capacity when the electrical energy consumption of the battery is equal to or greater than the energy consumption threshold, wherein determining whether the vehicle has excess electrical energy and computational capacity includes analyzing a computational usage of each of the plurality of ECUs and determining an energy consumption of computational tasks executing on the plurality of ECUs, and operate the vehicle as a hybrid computational hub when a determination is made that the vehicle has excess electrical energy and computational capacity, wherein operating the vehicle as the hybrid computational hub includes providing excess computational capacity of the computational resources of the plurality of ECUs to the external node for use in processing the computational task of the external node.

In various embodiments, the controller is configured to, by the processor: determine an impact on a range of the vehicle resulting from energy consumption resulting from the computational tasks executing on the ECUs when the energy consumption of the battery is equal to or greater than the energy consumption threshold, operate the vehicle as the hybrid computational hub when the impact on the range is less than a range threshold, wherein the excess computational capacity of the computational resources of the plurality of ECUs provided for use by the external node is limited based on a predetermined range of the vehicle, and offload a computational task executing on the plurality of ECUs to be processed by computational resources of the external node when the impact on the range is equal to or greater than the range threshold.

In various embodiments, the controller is configured to, by the processor: operate the vehicle as the hybrid computational hub when the excess computational capacity is equal to or greater than a computational threshold, and offload a computational task executing on the plurality of ECUs to be processed by computational resources of the external node when the excess computational capacity is less than the computational threshold.

In various embodiments, the controller is configured to, by the processor: determine performance of a communication link of the vehicle prior to operating the vehicle as the computational hub or the hybrid computational hub, and operate the vehicle as the computational hub or the hybrid computational hub only when the performance of the communication link is equal to or greater than a quality of experience (QOE) threshold or a quality of service (QOS) threshold.

In various embodiments, the controller is configured to, by the processor: determine performance of a communication link of the vehicle, determine performance of a communication link of the external node, and determine a rate of transfer of data between the vehicle and the external node based on the performance of the communication link of the vehicle and the performance of the communication link of the external node.

In various embodiments, the controller is configured to, by the processor: offload a computational task executing on the plurality of ECUs to be processed by computational resources of the external node when a determination is made that the vehicle does not have excess electrical energy or computational capacity.

In various embodiments, the controller is configured to, by the processor: monitor engagement of the vehicle with the external node while operating the vehicle as the computational hub or the hybrid computational hub, determine a power rating of the vehicle based on the engagement of the vehicle with the external node, and broadcast the power rating on the wireless communication network when operating the vehicle as the computational hub or the hybrid computational hub. In various embodiments, the controller is configured to, by the processor: broadcast the power rating on the wireless communication network and operate the vehicle as the computational hub or the hybrid computational hub only when the power rating of the vehicle is equal to or greater than power rating requirements of one or more of a plurality of external nodes on the wireless communication network.

In various embodiments, the wireless communication network is a vehicular ad hoc network, and the external node is another vehicle.

In various embodiments, the controller is configured to, by the processor: charge a fee to the external node for processing the computational task of the external node.

A method is provided for computation management of a vehicle. In one embodiment, the method includes, with a processor onboard the vehicle, monitoring an electrical energy consumption of a battery of the vehicle, operating, the vehicle as a computational hub when the electrical energy consumption of the battery is less than an energy consumption threshold, wherein operating the vehicle as the computational hub includes providing computational resources of a plurality of electric control units (ECUs) onboard the vehicle to an external node connected to the vehicle by a wireless communication network for use in processing a computational task as requested by the external node, determining whether the vehicle has excess electrical energy and computational capacity when the electrical energy consumption of the battery is equal to or greater than the energy consumption threshold, wherein determining whether the vehicle has excess electrical energy and computational capacity includes analyzing a computational usage of each of the plurality of ECUs and determining an energy consumption of computational tasks executing on the plurality of ECUs, and operating the vehicle as a hybrid computational hub when a determination is made that the vehicle has excess electrical energy and computational capacity, wherein operating the vehicle as the hybrid computational hub includes providing excess computational capacity of the computational resources of the plurality of ECUs to the external node for use in processing the computational task of the external node.

In various embodiments, the method includes, by the processor: determining an impact on a range of the vehicle resulting from energy consumption resulting from the computational tasks executing on the plurality of ECUs when the energy consumption of the battery is equal to or greater than the energy consumption threshold, operating the vehicle as the hybrid computational hub when the impact on the range is less than a range threshold, wherein the excess computational capacity of the computational resources of the plurality of ECUs provided for use by the external node is limited based on a predetermined range of the vehicle, and offloading a computational task executing on the plurality of ECUs to be processed by computational resources of the external node when the impact on the range is equal to or greater than the range threshold.

In various embodiments, the method includes, by the processor: operating the vehicle as the hybrid computational hub when the excess computational capacity is equal to or greater than a computational threshold, and offloading the computational task executing on the plurality of ECUs to be processed by computational resources of the external node when the excess computational capacity is less than the computational threshold.

In various embodiments, the method includes, by the processor: determining performance of a communication link of the vehicle prior to operating the vehicle as the computational hub or the hybrid computational hub, and operating the vehicle as the computational hub or the hybrid computational hub only when the performance of the communication link is equal to or greater than a quality of experience (QOE) threshold or a quality of service (QOS) threshold.

In various embodiments, the method includes, by the processor: determining performance of a communication link of the vehicle, determining performance of a communication link of the external node, and determining a rate of transfer of data between the vehicle and the external node based on the performance of the communication link of the vehicle and the performance of the communication link of the external node.

In various embodiments, the method includes, by the processor, offloading a computational task executing on the plurality of ECUs to be executed by computational resources of the external node when a determination is made that the vehicle does not have excess electrical energy or computational capacity In various embodiments, the method includes, by the processor: monitoring engagement of the vehicle with the external node while operating the vehicle as the computational hub or the hybrid computational hub, determining a power rating of the vehicle based on the engagement of the vehicle with the external node, and broadcasting the power rating to the wireless communication network when operating the vehicle as the computational hub or the hybrid computational hub. In various embodiments, the method includes, by the processor: broadcasting the power rating to the wireless communication network and operating the vehicle as the computational hub or the hybrid computational hub only when the power rating of the vehicle is equal to or greater than power rating requirements of one or more external nodes on the wireless communication network.

In various embodiments, the wireless communication network is a vehicular ad hoc network, and the external node is another vehicle.

In various embodiments, the method includes, by the processor, charging a fee to the external node for processing the computational task of the external node.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
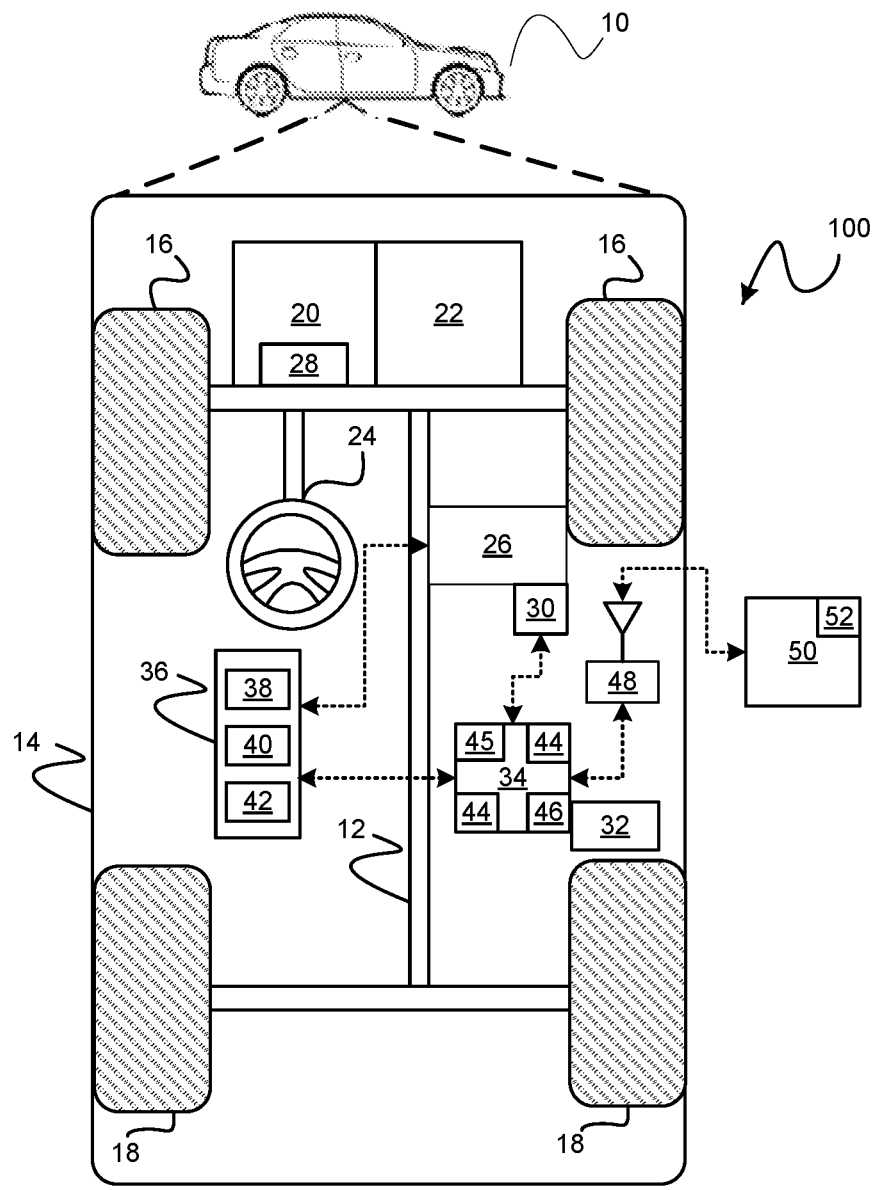
FIG. 1 is a functional block diagram of a vehicle that includes a computation management system, in accordance with various embodiments.

FIG. 1 illustrates a vehicle 10, according to an exemplary embodiment that includes a computation management system 100. In certain embodiments, the vehicle 10 comprises an automobile. In various embodiments, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 10 may also comprise a motorcycle and/or one or more other types of vehicles. In addition, in various embodiments, it will also be appreciated that the vehicle 10 may comprise any number of other types of mobile platforms.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 further includes a propulsion system 20, a transmission system 22, a steering system 24, a battery 26, at least one data storage device 32, at least one controller 34, a distributed controller area network (CAN) system 36, and a communication system 48 (e.g., telematics unit). In various embodiments, the vehicle 10 may include a central computing unit.

The propulsion system 20 includes an engine 28, such as a gasoline or diesel fueled combustion engine or an electric engine. The transmission system 22 is configured to transmit power from the propulsion system 20 to the wheels 16-18 according to selectable speed ratios. According to various embodiments, the transmission system 22 may include a step-ratio automatic transmission, a continuously-variable transmission, or other appropriate transmission. The steering system 24 influences a position of the wheels 16-18. While depicted as including a steering wheel for illustrative purposes, in some embodiments contemplated within the scope of the present disclosure, the steering system 24 may not include a steering wheel. The battery 26 may be any type of automotive battery, such as a lead-acid battery or a lithium-ion battery. One or more sensors 30 may be provided to sense a charge of the battery 26. The CAN system 36 includes a plurality of electronic control units (ECUs; e.g., ECUs 38, 40, and 42). Exemplary ECUs may include, but are not limited to, an engine control module (ECM), a powertrain control module (PCM), a transmission control module (TCM), a brake control module (EBCM), a central control module (CCM), a central timing module (CTM), a general electronic module (GEM), a body control module (BCM), and a suspension control module (SCM). The communication system 48 includes an antenna and may include one or more wireless communication devices.

The data storage device 32 stores data for use in controlling the vehicle 10 and/or systems and components thereof. As can be appreciated, the data storage device 32 may be part of the controller 34, separate from the controller 34, or part of the controller 34 and part of a separate system. The storage device 32 can be any suitable type of storage apparatus, including various different types of direct access storage and/or other memory devices. In one exemplary embodiment, the storage device 32 comprises a program product from which a computer readable memory device can receive a program that executes one or more embodiments of one or more processes of the present disclosure. In another exemplary embodiment, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensors 30, perform logic, calculations, methods and/or algorithms, and generate data based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate data.

As can be appreciated, that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 2:
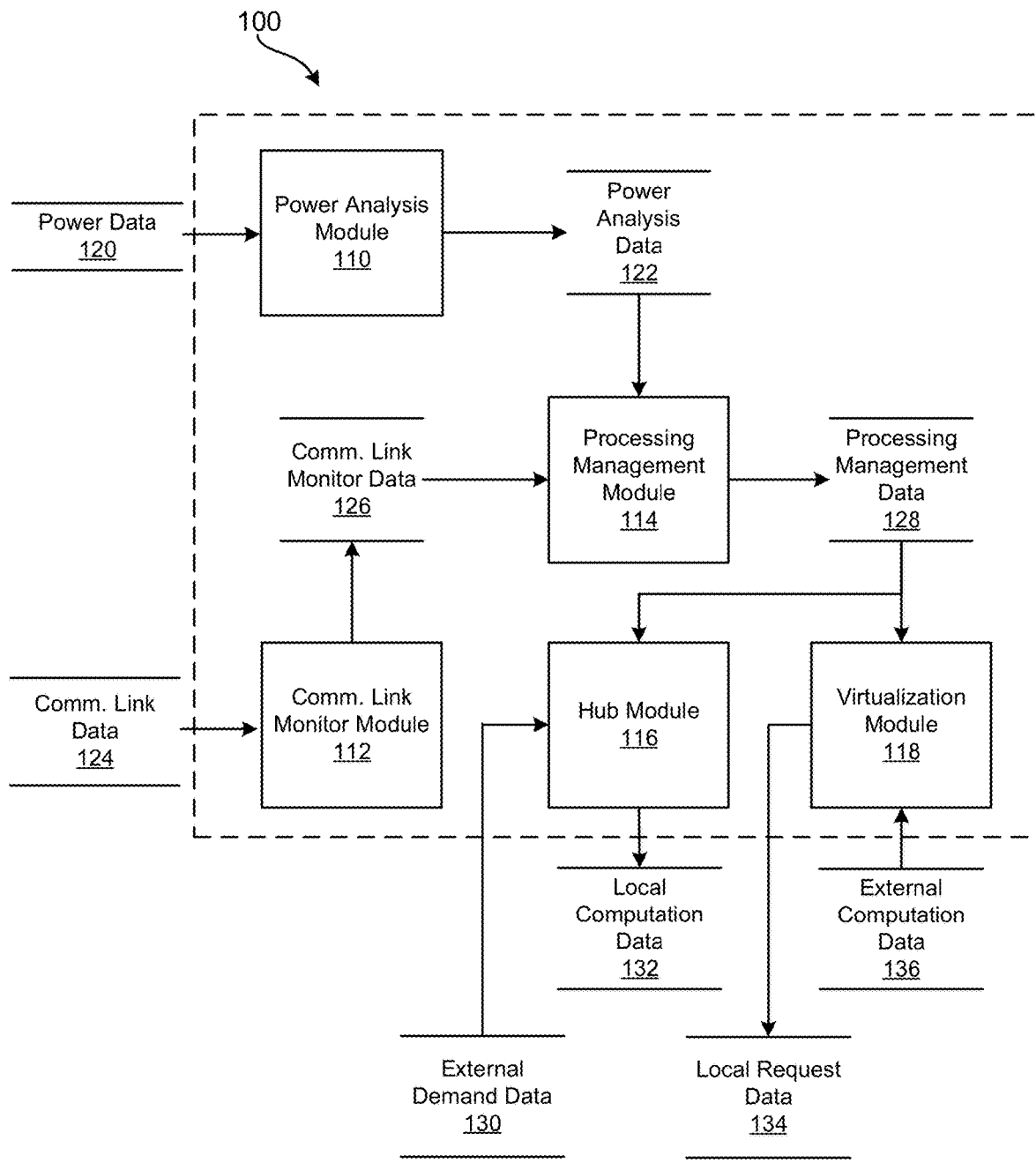
FIG. 2 is a dataflow diagram illustrating elements of the computation management system of the vehicle of FIG. 1, in accordance with various embodiments.

With reference to FIG. 2 and with continued reference to FIG. 1, a dataflow diagram illustrates elements of the computation management system 100 of FIG. 1 in accordance with various embodiments. As can be appreciated, various embodiments of the system 100 according to the present disclosure may include any number of modules embedded within the controller 34 which may be combined and/or further partitioned to similarly implement systems and methods described herein. Furthermore, inputs to the system 100 may be received from other control modules (not shown) associated with the vehicle 10, and/or determined/modeled by other sub-modules (not shown) within the controller 34. Furthermore, the inputs might also be subjected to preprocessing, such as sub-sampling, noise-reduction, normalization, feature-extraction, missing data reduction, and the like. In various embodiments, the system 100 includes a power analysis module 110, a communication link monitor module 112, a processing management module 114, a hub module 116, and a virtualization module 118.

In various embodiments, the power analysis module 110 receives as input power data 120 generated by, for example, the sensor 30. The power data 120 includes various data indicating energy reserves of the battery 26.

The power analysis module 110 performs monitoring of the energy reserves of the battery 26 to determine energy consumption thereof and continuously or periodically performs a comparison of the determined energy consumption to one or more energy consumption thresholds and generates power analysis data 122 based thereon. Exemplary energy consumption thresholds include, but are not limited to, averages of about 18 kW/hr. at 60 MPH for an autonomous electric vehicle, about 16.5 kW/hr. at 60 MPH for a semi-autonomous electric vehicle, and about 15 kW/hr. at 60 MPH for a manual propulsion vehicle (e.g., gasoline or diesel fueled).

In various embodiments, the communication link monitor module 114 receives as input communication link data 124 generated by the communication system 48. The communication link data 124 includes various data indicating, for example, a latency of wireless communication links provided by the communication system 48.

The communication link monitor module 112 performs an analysis of the performance of communication links of the vehicle 10 and generates communication link monitor data 126 based thereon. The determined performance may be compared to, for example, a quality of experience (QOE) threshold or a quality of service (QOS) threshold. In various embodiments, the vehicle 10 may be used as a computational hub or a hybrid computational hub when the performance of the communication links is equal to or greater than the QOE threshold and/or the QOS threshold. In various embodiments, the determined performance of the communication links may be used to determine a rate of data transfer between the vehicle 10 and an external node 50.

In various embodiments, the processing management module 114 receives as input the power analysis data 122 generated by the power analysis module 110 and the communication link monitor data 126 generated by the communication link monitor module 114. The power analysis data 122 includes various data indicating energy consumption of the battery 26 relative to the energy consumption threshold(s). The communication link monitor data 126 includes various data indicating the performance of the communication links relative to the QOE threshold and/or the QOS threshold.

The processing management module 114 performs a comparison of the power analysis data 122 and the communication link monitor data 126. When the energy consumption of the battery 26 is less than the energy consumption threshold and, optionally, when the performance of the communication links is sufficient (e.g., above the QOE threshold and/or the QOS threshold), then a determination may be made to operate the vehicle 10 as a computational hub. When the energy consumption of the battery 26 is equal to or greater than the energy consumption threshold, the processing management module 114 determines whether the vehicle 10 has excess energy and excess computational capacity. In various embodiments, this may include determining an impact on a range of the vehicle 10 resulting from energy consumption due to the computational tasks currently executing on the ECUs (e.g., ECUs 38, 40, and/or 42). In various embodiments, this may include analyzing computational tasks currently executing on each of the ECUs (e.g., ECUs 38, 40, and/or 42) and determining an energy consumption of the computational tasks currently executing on the ECUs (e.g., ECUs 38, 40, and/or 42). In some embodiments, information relating to the computational tasks currently executing on the individual ECUs (e.g., ECUs 38, 40, and/or 42) may be included in the power analysis data 122. In some embodiments, the processing management module 114 may receive data comprising this information from the ECUs (e.g., ECUs 38, 40, and/or 42) and/or another device of the vehicle 10. When the vehicle 10 has excess energy and computational capacity, then a determination may be made to operate the vehicle 10 as a hybrid computational hub. When the vehicle 10 does not have excess energy or computational capacity, then a determination may be made to virtualize (i.e., offload) one or more of the computational tasks currently executing on each of the ECUs (e.g., ECUs 38, 40, and/or 42).

In various embodiments, the hub module 116 receives as input the processing management data 128 generated by the processing management module 114. The processing management data 128 includes various data including a determination to operate the vehicle 10 a computational hub, a hybrid computational hub, or to virtualize one or more computational tasks currently executing on or intended to be executed on one or more of the ECUs (e.g., ECUs 38, 40, and/or 42).

When a determination is made to operate the vehicle 10 as a computational hub or a hybrid computational hub, the hub module 116 performs management of these operations. In various embodiments, the hub module 116 may receive external demand data 130 generated by external nodes 50. As used herein, the term external node may refer to any device capable of executing computational tasks, including but not limited to remote databases (e.g., cloud servers), other vehicles connected to the vehicle 10 by, for example, a vehicular ad hoc network, and various edge devices. The external demand data 130 includes various data indicating requests by the external nodes 50 for assistance with various computational tasks. The hub module 116 may select, or receive a user selection, of one or more of the computational tasks to be performed locally by the vehicle 10. This may include providing available computational resources of the ECUs (e.g., ECUs 38, 40, and/or 42) to external nodes 50 connected to the vehicle 10 by a wireless communication network (e.g., Wi-Fi, cellular, satellite, etc.). In this manner, the ECUs (e.g., ECUs 38, 40, and/or 42) may be used for completing the computational tasks requested by the external nodes 50, thereby utilizing unused resources of the vehicle 10 and reducing the processing burden of the external nodes 50. In the case of operating the vehicle 10 as a hybrid computational hub, the computational resources dedicated to processing the computational tasks of the external nodes 50 may be limited based to specific ECUs (e.g., ECUs 38, 40, and/or 42) and/or specific percentages of the processing capacity of the ECUs (e.g., ECUs 38, 40, and/or 42). In some embodiments, the computational resources dedicated to processing the computational tasks of the external nodes 50 may be limited based on other factors, such as the predetermined range of the vehicle 10. The hub module 116 generates local computation data 132 including various data indicating results of the processing of the computational tasks received by the ECUs (e.g., ECUs 38, 40, and/or 42) which may be transmitted to the external nodes 50.

In various embodiments, the virtualization module 118 receives as input the processing management data 128 generated by the processing management module 114.

When a determination is made to virtualize one or more computational tasks of the vehicle 10, the virtualization module 118 performs management of these operations. In various embodiments, the virtualization module 118 broadcasts local request data 134 including various data indicating the computational tasks that the vehicle 10 intends to offload. In the event that computational resources 52 (e.g., ECUs) of one or more external nodes 50 process the computational tasks, the virtualization module 118 receives external computation data 136 generated by the external nodes 50 including various data indicating results of the processing of the computational tasks by the computational resources 52 of the external nodes 50 which may be transmitted to the ECUs (e.g., ECUs 38, 40, and/or 42) of the vehicle 10.

With reference now to FIGS. 3-6 and with continued reference to FIGS. 1-2, flowcharts provide a method 200 and various optional aspects thereof for computation management for the vehicle 10 as performed by the system 100, in accordance with exemplary embodiments. As can be appreciated in light of the disclosure, the order of operation within the method 200 is not limited to the sequential execution as illustrated in FIGS. 3-6, but may be performed in one or more varying orders as applicable and in accordance with the present disclosure. In various embodiments, the method 200 can be scheduled to run based on one or more predetermined events, and/or can run continuously during operation of the vehicle 10.

Figure 3:
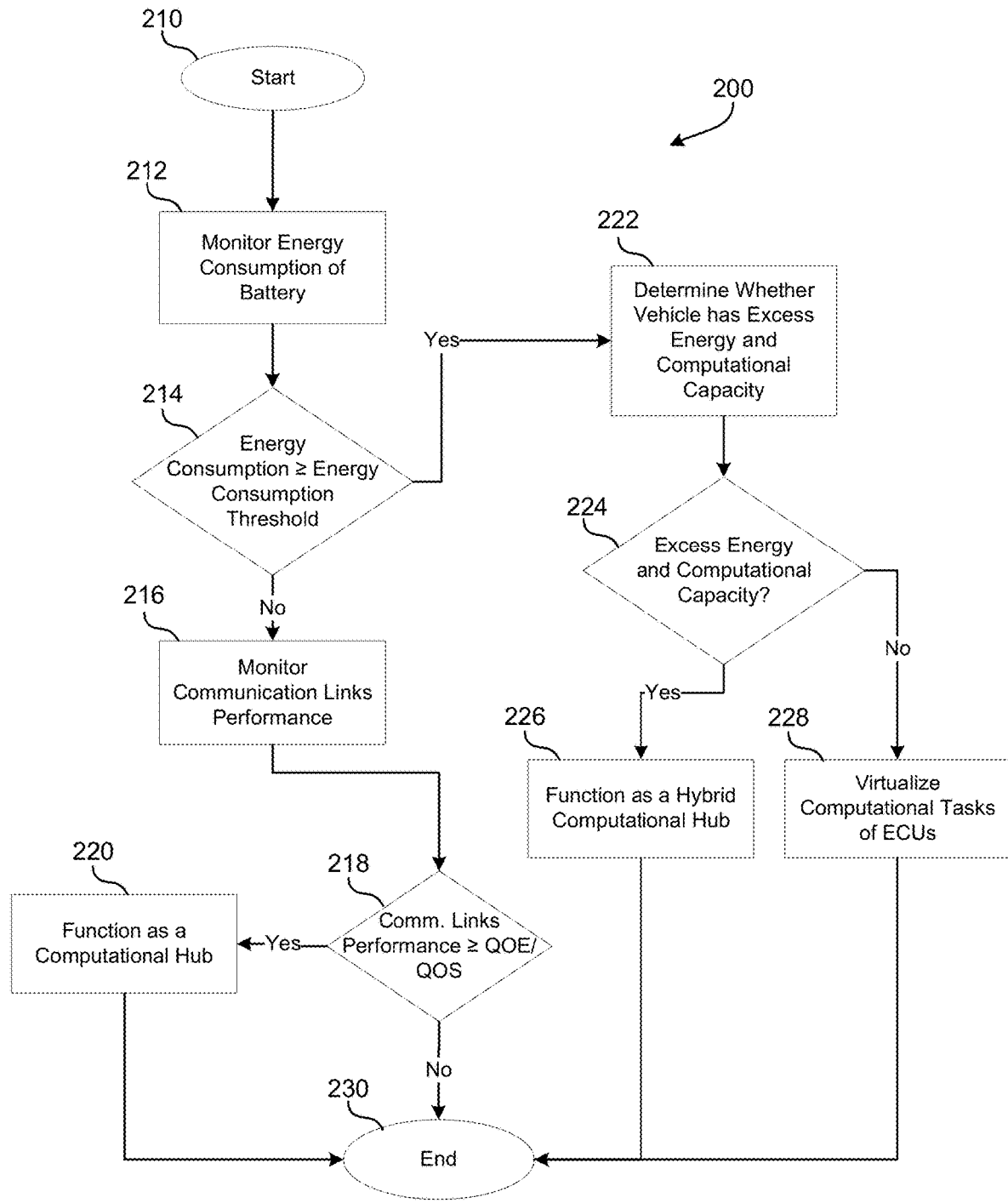
FIG. 3 is a flowchart of a method for managing computational resources and electrical energy consumption as performed by the computation management system of the vehicle of FIGS. 1 and 2, in accordance with exemplary embodiments.

In the example of FIG. 3, the method 200 may begin at 210. At 212, the method includes monitoring the energy consumption of the battery 26 of the vehicle 10. When the energy consumption of the battery 26 is less than the energy consumption threshold at 214, the method 200 includes monitoring the performance of the communication links of the vehicle 10. When the performance of the communication links is equal to or greater than the QOE threshold and/or the QOS threshold, the vehicle 10 is operated to function as a computational hub at 220. After operating as a computational hub, or when the performance of the communication links is less than the QOE threshold and/or the QOS threshold, the method may end at 228.

When the energy consumption of the battery 26 is greater than or equal to the energy consumption threshold at 214, the method 200 includes determining at 222 whether the vehicle 10 has excess energy and excess computational capacity. For example, such determination may be based, at least in part, on a current computational usage of the individual ECUs (e.g., ECUs 38, 40, and/or 42) of the vehicle 10 and energy requirements for the computational task(s). When the vehicle 10 has excess energy and excess computational capacity at 224, the method 200 includes operating the vehicle 10 as a hybrid computational hub. In contrast, when the vehicle 10 does not have excess energy or excess computational capacity at 224, the method 200 includes virtualizing one or more computational tasks of the vehicle 10 at 228. After operating as the hybrid computational hub or virtualizing the computational tasks, the method may end at 228.

Figure 4:
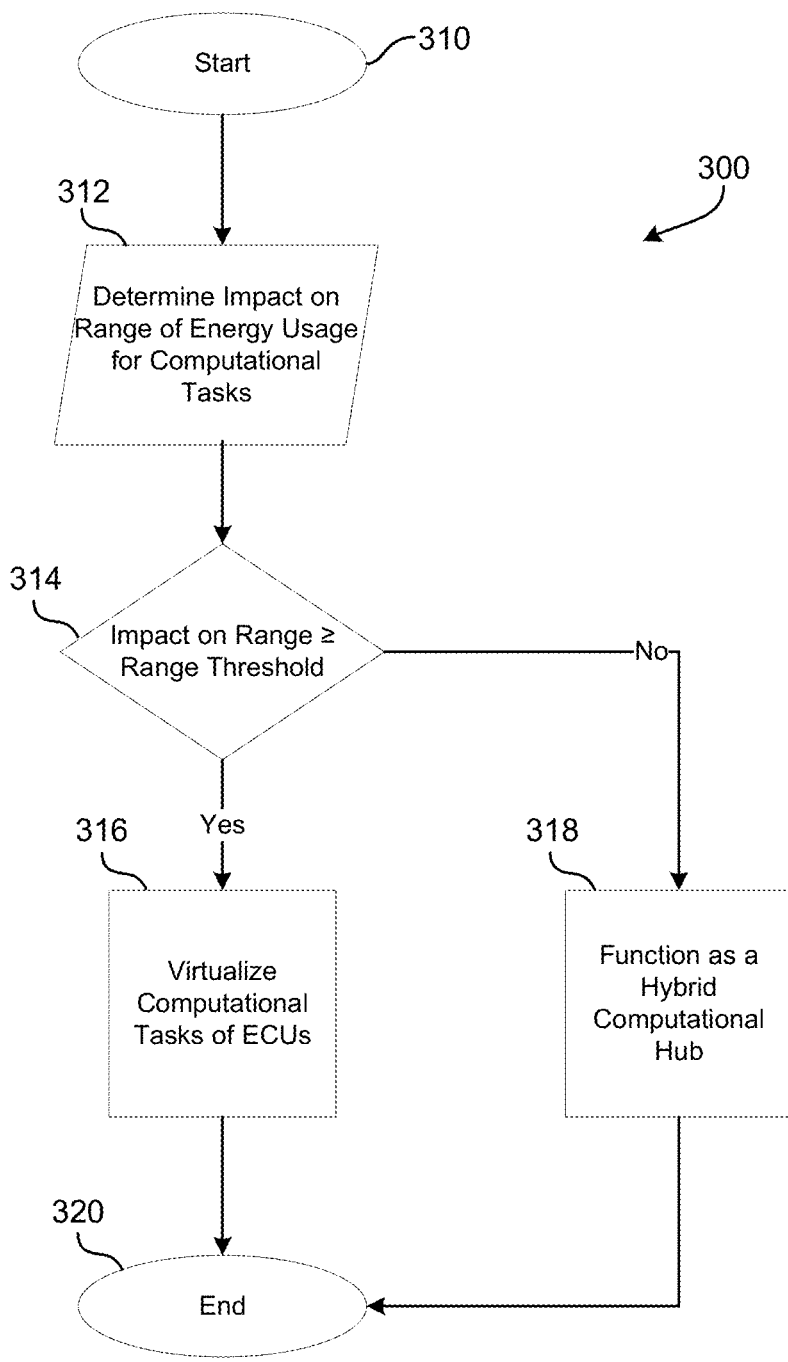
FIG. 4 is a flowchart of certain exemplary aspects of the method of FIG. 3 as performed by the computation management system of the vehicle of FIGS. 1 and 2, in accordance with an embodiment, wherein a determination of whether to function as a hybrid computational hub or virtualize computational tasks is based on an impact on a range of the vehicle due to energy consumption associated with processing computational tasks.

Referring now to FIG. 4, an exemplary method 300 is presented for determining whether the vehicle 10 has excess energy, for example, at 224 of the method 200 in FIG. 3. The method 300 starts at 310. At 312, the method 300 includes comparing the energy requirements for the computational task(s) (e.g., about 1 kW in autonomous electric vehicles) to energy requirements necessary for the vehicle 10 to achieve a predetermined range. When the impact of processing the computational task(s) on the range of the vehicle 10 at 314 is equal to or greater than a range threshold, the method 300 includes virtualizing one or more computational tasks of the vehicle 10 at 316. When the impact of processing the computational task(s) on the range of the vehicle 10 at 314 is less than the range threshold, the method 300 includes operating the vehicle 10 as the hybrid computational hub at 318. In various embodiments, during operation of the vehicle 10 as the hybrid computational hub, the computational resource provided for processing computational tasks of external nodes 50 is limited such that the energy requirements for such operations do not cause the impact on the range to equal or exceed the range threshold. The method 300 may end at 320.

Figure 5:
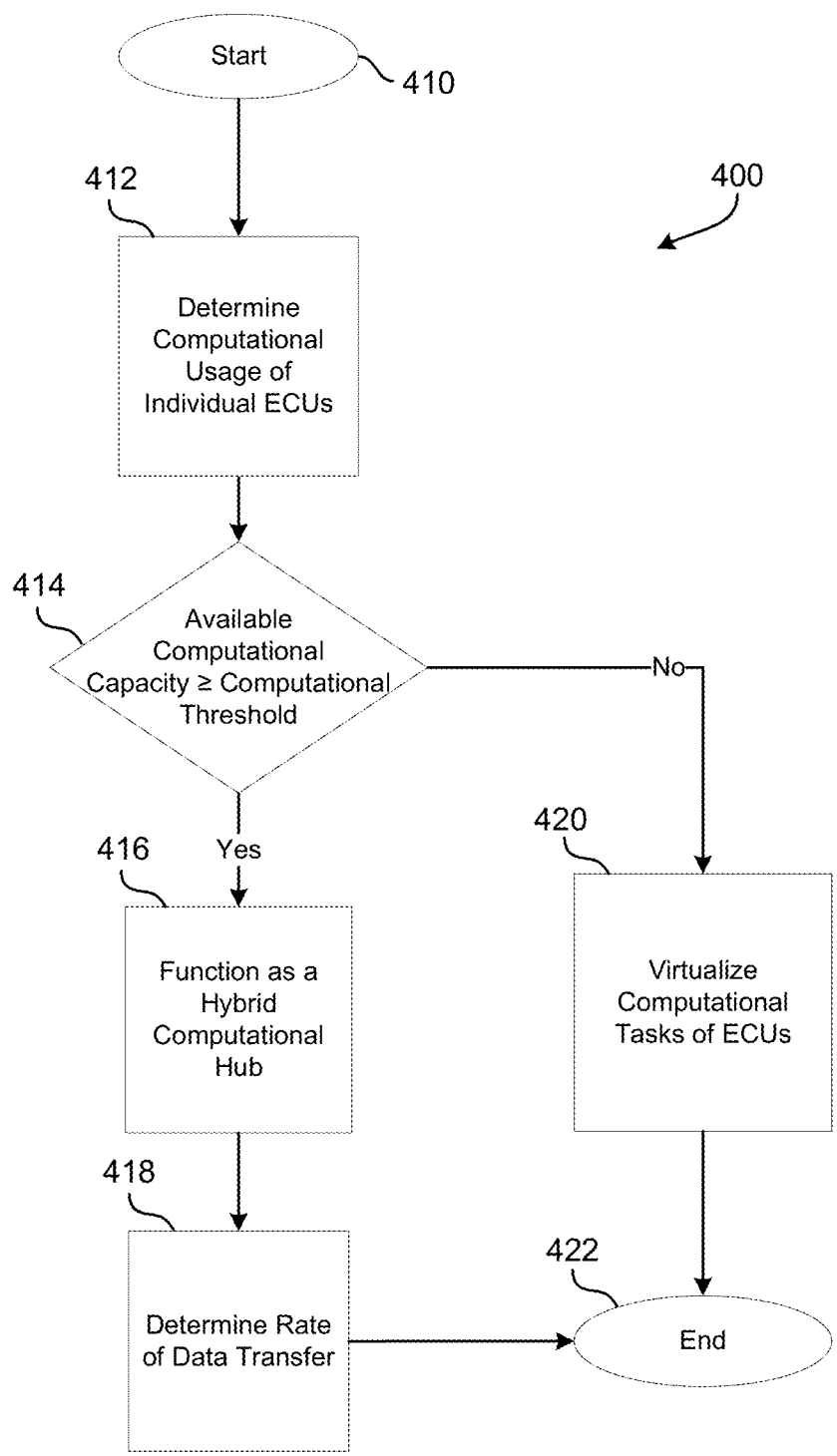
FIG. 5 is a flowchart of certain exemplary aspects of the process of FIG. 3 as performed by the computation management system of the vehicle of FIGS. 1 and 2, in accordance with an embodiment, wherein a determination of whether to function as a hybrid computational hub or virtualize computational tasks is based on computational usage of individual electric control units (ECUs) relative to a computational threshold.

Referring now to FIG. 5, an exemplary method 400 is presented for determining whether the vehicle 10 has excess computational capacity, for example, at 224 of the method 200 in FIG. 3. The method 400 starts at 410. At 412, the method 400 includes comparing the current computational usage of the individual ECUs (e.g., ECUs 38, 40, and/or 42) of the vehicle 10 to a computational threshold. When the current computational usage is equal to or greater than a computational threshold at 414, the method 400 includes operating the vehicle 10 as a hybrid computational hub at 416. Optionally, the method 400 may include determining a rate of data transfer for use while operating as the hybrid computational hub. In various embodiments, this determination may be based, at least in part, on the performance of communication links of the vehicle 10 and/or the external nodes 50. When the current computational usage is less than a computational threshold at 414, the method 400 includes virtualizing one or more computational tasks of the vehicle 10 at 420. The method 400 may end at 422.

Figure 6:
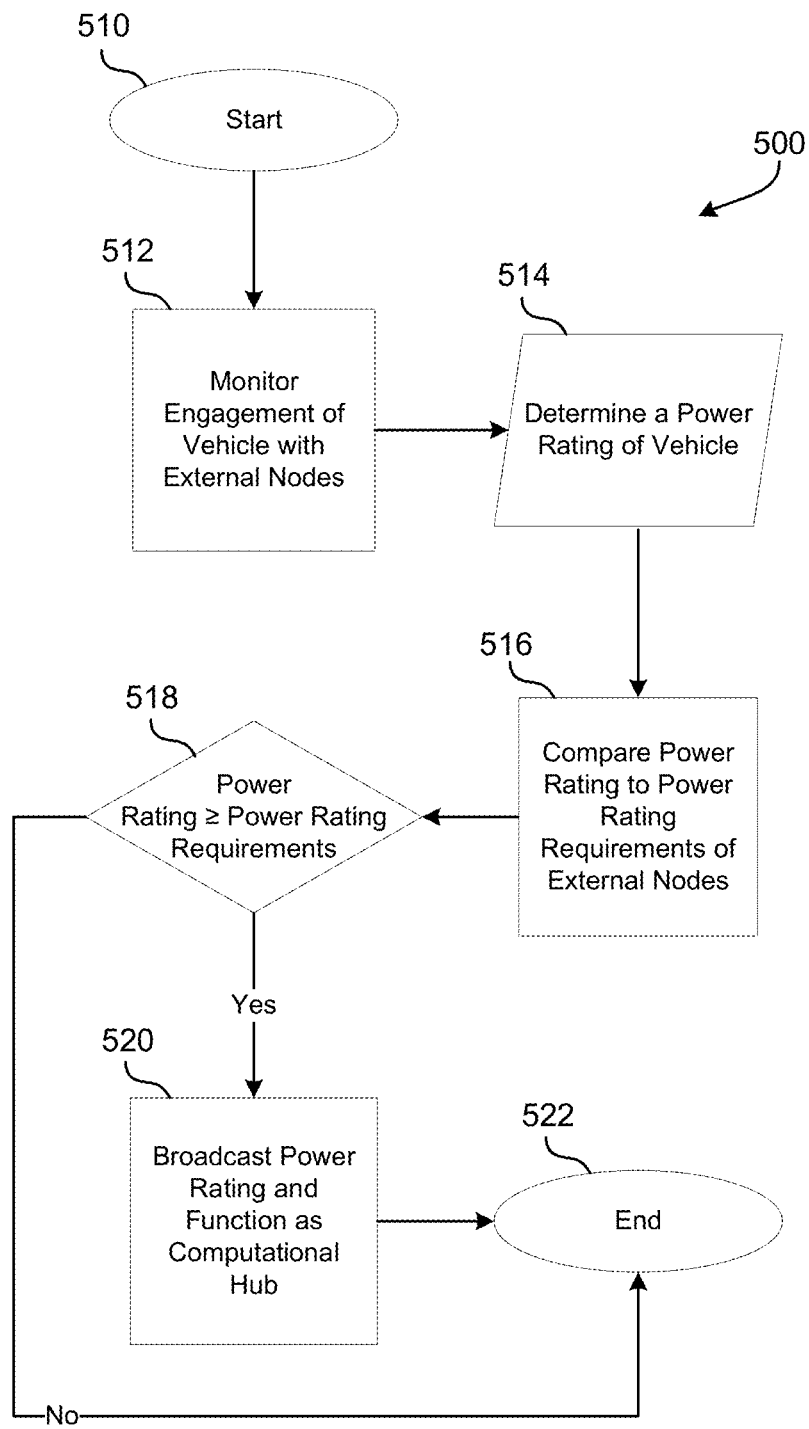
FIG. 6 is a flowchart of certain exemplary aspects of the process of FIG. 3 as performed by the computation management system of the vehicle of FIGS. 1 and 2, in accordance with an embodiment, wherein a power rating is assigned to the vehicle based on engagement of the vehicle with external nodes while operating as a computational hub.

Referring now to FIG. 6, an exemplary method 500 is provided for providing a rating of the vehicle 10 as the computational hub or the hybrid computational hub for reference by the external nodes 50. The method 500 starts at 510. At 512, the method 500 includes monitoring an engagement between the vehicle 10 and the external nodes 50 while the vehicle 10 is operating as the computational hub or the hybrid computational hub. At 514, the method 500 includes averaging the power output of the vehicle 10 for a plurality of past engagements to determine a power rating of the vehicle 10. At 516, the method 500 includes comparing power rating requirements of the requests broadcast by the external nodes 50 with the power rating of the vehicle 10. When the power rating is equal to or greater than the power rating requirements of the requests, the method 500 includes at 520 operating the vehicle 10 as the computational hub or the hybrid computational hub to process one or more of the requests. In some embodiments, a determination of whether to broadcast the power rating may be based on a determination of an impact on battery performance. In such embodiments, a determination that the battery will be impacted may result in virtualization of computational tasks based on power degradation and a determination that the battery will not be impacted may result in operation of the vehicle 10 as a computational hub or hybrid computational hub based on the power rating. Once the requests have been processed, or when the power rating of the vehicle 10 is less than the power requirements of the requests, the method 500 may end at 522.

In various embodiments, parameters of the engagements that are monitored may include, but are not limited to, a rate of discharge, an average rate of output power, a maximum rate of output power, an average rate of output voltage, an average direct current (DC) to alternating current (AC) feedback, a number of discharge channels, a percentage below one or more thresholds, an average rate of charge degradation, and/or an average rate of current fluctuations. Additional connectivity factors that may be included in the power rating of the vehicle 10 may include, but are not limited to, a probability of always-connected, a number of communication channels, a maximum output power, a telematics measurement preference (e.g., RF, BLER, and/or throughput), a number of antennas, latency, and bandwidth. Additional computation factors that may be included in the power rating of the vehicle 10 may include, but are not limited to, scalability, power consumption rate, compression ratio, relative efficiency, processing speed, response time, and/or percentage of downtime. In various embodiments, the power rating may be a function of time.

In various embodiments, the vehicle 10 may be a member of a group or fleet of commonly owned or otherwise related vehicles. In such embodiments, the vehicle 10 may be configured to perform a situational awareness determination (e.g., instructions executed by the controller 34), that is, decisions relating to whether to virtualize one or more computational tasks of the vehicle 10, or to function as a computational hub or a hybrid computational hub, may consider needs of the group/fleet of vehicles in addition to the conditions and needs of the vehicle 10. For example, each of the vehicles within the group/fleet, including the vehicle 10, may have a corresponding planned route or a planned fleet schedule. The vehicle 10 or another device (e.g., a remote server) can determine and balance a percentage of computational tasks to be virtualized relative to in-vehicle computation based on the situational awareness determination. Nonlimiting examples of considerations in such embodiments may include projected travel based on battery usage, estimated amounts of energy degradation, scheduled applicational computational needs, estimated communication channels available, common group computational needs among "n" number of group/fleet vehicles during various times of the day and areas of group/fleet intersection, etc.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for computation management of a vehicle, the system comprising:
    a plurality of electric control units (ECUs) onboard the vehicle;
    a battery onboard the vehicle that is configured to provide electrical energy to the plurality of ECUs;
    a communication system onboard the vehicle configured to receive and transmit data through a wireless communication network; and
    a controller in communication with the plurality of ECUs, the battery, and the communication system that is configured to, by a processor:
        monitor an electrical energy consumption of the battery;
        operate the vehicle as a computational hub when the electrical energy consumption of the battery is less than an energy consumption threshold, wherein operating the vehicle as the computational hub includes providing computational resources of the plurality of ECUs to at least one external node connected to the vehicle through the wireless communication network for use in processing at least one computational task of the at least one external node as requested by the at least one external node;
        determine whether the vehicle has excess electrical energy and computational capacity when the electrical energy consumption of the battery is equal to or greater than the energy consumption threshold, wherein determining whether the vehicle has excess electrical energy and computational capacity includes determining a computational usage of each of the plurality of ECUs of computational tasks executing on the plurality of ECUs and determining an energy consumption of the computational tasks executing on the plurality of ECUs; and
        operate the vehicle as a hybrid computational hub when a determination is made that the vehicle has excess electrical energy and that the vehicle has excess computational capacity that is equal to or greater than a computational threshold, wherein operating the vehicle as the hybrid computational hub includes providing the excess computational capacity of the computational resources of the plurality of ECUs to the at least one external node for use in processing the at least one computational task of the at least one external node.

2. The system of claim 1, wherein the controller is configured to, by the processor:
    determine an impact on a range of the vehicle resulting from energy consumption resulting from the computational tasks executing on the ECUs when the energy consumption of the battery is equal to or greater than the energy consumption threshold;
    operate the vehicle as the hybrid computational hub when the impact on the range is less than a range threshold, wherein the excess computational capacity of the computational resources of the plurality of ECUs provided for use by the at least one external node is limited based on a predetermined range of the vehicle; and
    offload at least one of the computational tasks executing on the plurality of ECUs to be processed by computational resources of the at least one external node when the impact on the range is equal to or greater than the range threshold.

3. The system of claim 1, wherein the controller is configured to, by the processor:
    offload at least one of the computational tasks executing on the plurality of ECUs to be processed by computational resources of the at least one external node when the excess computational capacity is less than the computational threshold.

4. The system of claim 1, wherein the controller is configured to, by the processor:
    determine performance of at least one communication link of the vehicle prior to operating the vehicle as the computational hub or the hybrid computational hub; and
    operate the vehicle as the computational hub or the hybrid computational hub only when the performance of the at least one communication link is equal to or greater than a quality of experience (QOE) threshold or a quality of service (QOS) threshold.

5. The system of claim 1, wherein the controller is configured to, by the processor:
    determine performance of at least one communication link of the vehicle;
    determine performance of a communication link of the at least one external node; and
    determine a rate of transfer of data between the vehicle and the at least one external node based on the performance of the at least one communication link of the vehicle and the performance of the communication link of the at least one external node.

6. The system of claim 1, wherein the controller is configured to, by the processor:
    offload at least one of the computational tasks executing on the plurality of ECUs to be processed by computational resources of the at least one external node when a determination is made that the vehicle does not have excess electrical energy or computational capacity.

7. The system of claim 1, wherein the controller is configured to, by the processor:
    monitor engagement of the vehicle with the at least one external node while operating the vehicle as the computational hub or the hybrid computational hub;
    determine a power rating of the vehicle based on the engagement of the vehicle with the at least one external node; and
    broadcast the power rating on the wireless communication network when operating the vehicle as the computational hub or the hybrid computational hub when the power rating of the vehicle is equal to or greater than power rating requirements of one or more of a plurality of external nodes on the wireless communication network.

8. The system of claim 1, wherein the vehicle is a first member of a group of vehicles, the at least one external node is a second member of the group of vehicles, and the controller is configured to, by the processor, determine whether to offload one or more computational tasks executing on the plurality of ECUs of the first member to be processed by computational resources of one or more other vehicles of the group of vehicles or to function as the computational hub or the hybrid computational hub, at least in part, while considering needs of other vehicles in the group of vehicles.

9. The system of claim 1, wherein the wireless communication network is a vehicular ad hoc network, the vehicle is a first member of a group of vehicles, and the at least one external node is another vehicle that is a second member of the group of vehicles, wherein the controller is configured to, by the processor:
 determine that at least one of the computational tasks executing on the plurality of ECUs should be offloaded to be processed by computational resources of one or more of the other vehicles of the group of vehicles when a determination is made that the first member does not have excess electrical energy or computational capacity;
 broadcast local request data indicating the at least one of the computational tasks executing on the plurality of ECUs determined to be offloaded; and
 offload the at least one of the computational tasks executing on the plurality of ECUs to be processed by the computational resources of the one or more of the other vehicles of the group of vehicles.

10. The system of claim 1, wherein the controller is configured to, by the processor:
 charge a fee to the at least one external node for processing the at least one computational task of the at least one external node.

11. A method for computation management of a vehicle, the method comprising:
 monitoring, with a processor onboard the vehicle, electrical energy consumption of a battery of the vehicle;
 operating, by the processor, the vehicle as a computational hub when the electrical energy consumption of the battery is less than an energy consumption threshold, wherein operating the vehicle as the computational hub includes providing computational resources of a plurality of electric control units (ECUs) onboard the vehicle to at least one external node connected to the vehicle by a wireless communication network for use in processing at least one computational task of the at least one external node as requested by the at least one external node;
 determining, by the processor, whether the vehicle has excess electrical energy and computational capacity when the electrical energy consumption of the battery is equal to or greater than the energy consumption threshold, wherein determining whether the vehicle has excess electrical energy and computational capacity includes determining a computational usage of each of the plurality of ECUs of computational tasks executing on the plurality of ECUs and determining an energy consumption of the computational tasks executing on the plurality of ECUs; and
 operating, by the processor, the vehicle as a hybrid computational hub when a determination is made that the vehicle has excess electrical energy and that the vehicle has excess computational capacity that is equal to or greater than a computational threshold, wherein operating the vehicle as the hybrid computational hub includes providing excess computational capacity of the computational resources of the plurality of ECUs to the at least one external node for use in processing the at least one computational task of the at least one external node.

12. The method of claim 11, further comprising, by the processor:
 determining an impact on a range of the vehicle resulting from energy consumption resulting from the computational tasks executing on the plurality of ECUs when the energy consumption of the battery is equal to or greater than the energy consumption threshold;
 operating the vehicle as the hybrid computational hub when the impact on the range is less than a range threshold, wherein the excess computational capacity of the computational resources of the plurality of ECUs provided for use by the at least one external node is limited based on a predetermined range of the vehicle; and
 offloading at least one of the computational tasks executing on the plurality of ECUs to be processed by computational resources of the at least one external node when the impact on the range is equal to or greater than the range threshold.

13. The method of claim 11, further comprising, by the processor:
 offloading at least one of the computational tasks executing on the plurality of ECUs to be processed by computational resources of the at least one external node when the excess computational capacity is less than the computational threshold.

14. The method of claim 11, further comprising, by the processor:
 determining performance of at least one communication link of the vehicle prior to operating the vehicle as the computational hub or the hybrid computational hub; and
 operating the vehicle as the computational hub or the hybrid computational hub only when the performance of the at least one communication link is equal to or greater than a quality of experience (QOE) threshold or a quality of service (QOS) threshold.

15. The method of claim 11, further comprising, by the processor:
 determining performance of at least one communication link of the vehicle;
 determining performance of at least one communication link of the at least one external node; and
 determining a rate of transfer of data between the vehicle and the at least one external node based on the performance of the at least one communication link of the vehicle and the performance of the at least one communication link of the at least one external node.

16. The method of claim 11, further comprising, by the processor:
 offloading, by the processor, at least one of the computational tasks executing on the plurality of ECUs to be executed by computational resources of the at least one external node when a determination is made that the vehicle does not have excess electrical energy or computational capacity.

17. The method of claim 11, further comprising, by the processor:
monitoring engagement of the vehicle with the at least one external node while operating the vehicle as the computational hub or the hybrid computational hub;
determining a power rating of the vehicle based on the engagement of the vehicle with the at least one external node; and
broadcasting the power rating to the wireless communication network when operating the vehicle as the computational hub or the hybrid computational hub when the power rating of the vehicle is equal to or greater than power rating requirements of one or more external nodes on the wireless communication network.

18. The method of claim 11, wherein the vehicle is a first member of a group of vehicles, the at least one external node is a second member of the group of vehicles, the method including, by the processor, determining whether to offload one or more computational tasks executing on the plurality of ECUs of the first member to be processed by computational resources of one or more other vehicles of the group of vehicles or to function as the computational hub or the hybrid computational hub, at least in part, while considering needs of other vehicles in the group of vehicles.

19. The method of claim 11, wherein the wireless communication network is a vehicular ad hoc network, the vehicle is a first member of a group of vehicles, and the at least one external node is another vehicle that is a second member of the group of vehicles, wherein the method includes, by the processor:
determining that at least one of the computational tasks executing on the plurality of ECUs should be offloaded to be processed by computational resources of one or more of the other vehicles of the group of vehicles when a determination is made that the first member does not have excess electrical energy or computational capacity;
broadcasting local request data indicating the at least one of the computational tasks executing on the plurality of ECUs determined to be offloaded; and
offloading the at least one of the computational tasks executing on the plurality of ECUs to be processed by the computational resources of the one or more of the other vehicles of the group of vehicles.

20. The method of claim 11, further comprising, by the processor, charging a fee to the at least one external node for processing the at least one computational task of the at least one external node.

* * * * *